United States Patent Office 3,129,195
Patented Apr. 14, 1964

3,129,195
COPOLYMERS OF UNSATURATED ALDEHYDES AND —SO₃— CONTAINING MONOMERS AND THEIR PREPARATION
Ronald K. June, Pleasant Hill, Aldo De Benedictis, Berkeley, and Paul H. Williams, Orinda, Calif., assignors to Shell Oil Company, New York, N.Y., a corporation of Delaware
No Drawing. Filed Feb. 8, 1962, Ser. No. 171,817
23 Claims. (Cl. 260—29.6)

This invention relates to new copolymers and their preparation. More particularly, the invention relates to new copolymers of unsaturated aldehydes and —SO₃— containing monomers, to their preparation and to their utilization, particularly for the treatment of fibrous materials, such as paper, textiles and the like.

Specifically, the invention provides new and particularly useful high molecular weight copolymers comprising the product of polymerization of a mixture of (1) an unsaturated aldehyde, and preferably acrolein, and (2) an ethylenically unsaturated monomer possessing a —SO₃— group and preferably sulfonic acid or sulfonate group, such as, for example, sodium vinylbenzenesulfonate. The invention further provides a new process for preparing the above-described copolymers.

As a special embodiment, the invention provides new water-soluble copolymers of the above-noted unsaturated aldehydes and —SO₃— containing monomers, and a method for utilizing the water soluble copolymers for the treatment of fibrous materials, such as paper, particularly to impart improved dimensional stability and improved wet strength.

It is known that unstabilized acrolein changes spontaneously into a solid insoluble polymer known as "disacryl." This same insoluble polymer can also be obtained by heating acrolein to high temperatures in the presence of peroxides. These insoluble polymers have never acquired any technical importance, chiefly because of their low molecular weight and their insolubility in water and solvents.

It has recently been found that homopolymers of acrolein and copolymers of acrolein with monomers such as acrylonitrile and acrylate esters having higher molecular weights can be obtained by effecting the polymerization under special catalyst conditions. One of these special polymerization techniques is disclosed and claimed in copending patent application Serial No. 859,154, filed December 4, 1959. These polymers and copolymers, however, are not soluble in solvents and water, and must be further reacted with solubilizing agents before they can be utilized.

It is an object of the invention, therefore, to provide new polymers of unsaturated aldehydes. It is a further object to provide new high molecular weight copolymers of unsaturated aldehydes and a method for their preparation. It is a further object to provide new copolymers of acrolein which are thermoplastic and can be molded to form valuable plastic products. It is a further object to provide new water-soluble copolymers of unsaturated aldehydes which can be easily prepared and have many unusual and valuable properties. It is a further object to provide new high molecular weight water-soluble copolymers of unsaturated aldehydes which are particularly useful and valuable for the treatment of fibrous materials. It is a further object to provide new water-soluble copolymers of unsaturated aldehydes which are particularly useful as a wet strength agent for paper. It is a further object to provide a method for treating fibrous materials to improve their dimensional stability and wet strength. These and other objects of the invention will be apparent from the following detailed description thereof.

It has now been discovered that these and other objects may be accomplished by the new copolymers of the invention comprising the product of polymerization of an unsaturated aldehyde, and preferably acrolein, with an ethylenically unsaturated monomer possessing a sulfonic acid or sulfonate group, such as, for example, sodium vinylbenzenesulfonate. It has been surprisingly found that these new high molecular weight polymers are thermoplastic products which can be used for a variety of useful applications. The high molecular weight solid copolymers may be molded to form valuable products. Many of the products, and particularly those products containing free sulfonic acid or water-soluble salt sulfonate groups have surprising solubility in water and find particular use for the treatment of fibrous materials, such as paper, textiles and the like to improve their properties. When applied to paper, for example, the polymers effect improvement in dimensional stability and wet strength.

The alpha, beta-ethylenically unsaturated aldehydes used in making the new copolymers comprise those mono-aldehydes having an ethylenic group in an alpha,beta-position relative to the aldehyde group, such as, for example, acrolein and alpha- and beta-substituted acroleins, as methacrolein, alpha-ethylacrolein, alpha-butylacrolein, alpha-chloroacrolein, beta-phenylacrolein, alpha-decyl-acrolein, alpha-cyclohexylacrolein, crotonaldehyde and the like. Preferred aldehydes to be employed in making the copolymers include the alpha,beta-monoethylenically unsaturated aldehydes containing from 3 to 12 carbon atoms, and especially acrolein and the alpha- and beta-substituted acroleins where the substituent on the alpha and/or beta positions is an alkyl, cycloalkyl or aryl group containing no more than 8 carbon atoms. 2-alkenals containing up to 8 carbon atoms come under special consideration.

A monomer to be copolymerized with the unsaturated aldehydes comprise those monomers having an ethylenic group and a —SO₃— containing group, such as a sulfonic acid or sulfonate group. Examples of these include, among others, vinylbenzenesulfonic acid, allylsulfonic acid, vinylsulfonic acid, alpha-methallylsulfonic acid, allyloxyethylsulfonic acid, methallyloxyethylsulfonic acid, allylthioethylsulfonic acid, allylthiopropanolsulfonic acid, vinylnaphthalenesulfonic acid, allylxylenesulfonic acid, vinylcyclohexenesulfonic acid, vinylcyclopentanesulfonic acid, sodium vinylbenzenesulfonate, potassium allylsulfonate, sodium vinylsulfonate, lithium vinylbenzenesulfonate, potassium methallyloxyethylsulfonate, ammonium vinylbenzenesulfonate, zinc allylthiopropanolsulfonate, sodium vinylnaphthalenesulfonate, sodium vinylcyclohexenesulfonate, zinc allyloxyethylsulfonate, calcium vinylsulfonate, sodium allylxylenesulfonate, acrylic and methacrylic acid esters of sulfonic acid and sulfonate substituted alcohols as 3-hydroxypropanesulfonate and 2-hydroxyethane sulfonate and the like, and mixtures thereof.

Particularly preferred monomers to be copolymerized with the aldehydes include the alkenylsulfonic acids, alkenylarylsulfonic acids, alkenylcycloalkanesulfonic acids, alkenolethers and alkenoic esters of sulfonic acid substituted alcohols, and water-soluble salts of the foregoing members and preferably their sodium, potassium, magnesium, lithium, zinc, calcium, aluminum and ammonium salts.

The amount of the unsaturated aldehyde and the —SO₃— containing monomer to be employed in making the new copolymers may vary within certain limits. The amount of the unsaturated aldehyde should be at least 5% by weight of the mixture and preferably not more than 99.5% by weight of the monomer mixture. Preferably, the unsaturated aldehyde varies from 30% to 98% by weight of the mixture and the —SO₃— containing monomer makes up from 70% to 2% by weight of the mixture.

In some cases, it may be desirable to replace a portion of the —SO₃— containing monomer with a dissimilar ethylenically unsaturated monomer or monomers. Examples of such other monomers include the mono- and polyethylenically unsaturated monomers such as, for example, styrene, alpha-methylstyrene, allyl alcohol, vinyl acetate, maleic acid or anhydride, acrylic and methacrylic acids and their alkyl esters, monoolefins, diolefins, vinyl halides as vinyl chloride, allyl esters of monocarboxylic acids, vinyl pyridines, acrylamide, vinyl pyrrolidone, allylamine, and methacrylonitrile and acrylonitrile, and mixtures thereof. These dissimilar monomers preferably make up from .1% to 50% by weight of the mixture of monomers. As used herein, the expression "copolymer" is meant to include the polymerization products containing units of the third, fourth, etc. monomers.

The new copolymers may be prepared by a variety of suitable methods. They may be prepared, for example, by contacting the monomers with a free radical yielding catalyst at low temperatures, e.g., temperatures below about 30° C., by exposing the monomers to high energy ionizing radiation, and by contacting the monomers with redox catalyst system.

In those cases where high energy ionization is employed for the copolymerization, it is preferred to employ high energy electrons, protons and photons. Total dosage preferably employed ranges from about $10^5 \times 10^6$ rads. A rad is defined as 100 ergs of ionizing energy adsorbed per gram of irradiated mixture. The dosage rate preferably varies from about $10^4$ to $10^{12}$ rads per hour. Temperatures employed preferably vary from about 0° C. to 100° C.

The new copolymers are preferably prepared by polymerizing the monomers in an aqueous system using a redox polymerizing catalyst system, i.e., a free radical catalyst and a reducing agent. Examples of free radical yielding catalysts that may be employed include, among others, peroxides, such as benzoyl peroxide, hydrogen peroxide, potassium persulfate, potassium permanganate, methyl cyclohexyl peroxide, alkali perborates, diacetyl peroxide, tertiary butyl hydroperoxide, tertiary amyl hydroperoxide, acetyl benzoyl peroxide, cumene hydroperoxide, tetralin hydroperoxide, phenylcyclohexane hydroperoxide, tertiary-butylisopropyl benzene hydroperoxide, tertiary butyl peracetate, tertiary butyl perbenzoate, ditertiary butyl phthalate, ditertiary butyl peradipate, tertiary butyl percarbonate and the like. Particularly preferred free radical yielding catalysts include the peroxides, such as the dialkyl peroxides, diaryl peroxides, tertiary alkyl hydroperoxides, alkyl peresters of percarboxylic acids, and particularly those of the above-noted groups which contain not more than 18 carbon atoms per molecule.

The above-described free radical yielding catalysts are employed in small amounts, the exact amount being dependent upon the particular type selected. In general, the amount of catalyst used will vary from about $1 \times 10^{-6}$ to about $2 \times 10^{-2}$ mols per mol of unsaturated monomer to be polymerized. Preferred amounts vary from about $1 \times 10^{-3}$ to $1 \times 10^{-4}$ mols per mol of material being polymerized.

The material employed with the above-described free radical yielding catalyst may be any of the various types of reducing agents. Examples of these include the organic sulfur compounds, such as sulfonic acids or their salts, alpha-oxysulfones, sulfoxylates, alpha-aminosulfones, thioethers which are preferably substituted by a hetero atom such as nitrogen in alpha position, or mercaptans with the simultaneous presence of labile halogen, mono or polyvalent aliphatic alcohols, beta-mercaptoethanol, levulinic acid, sterol compounds, dicyandiamidine, thiobarbituric acid, sulfur dioxide or water-soluble sulfur compounds, and particularly the sulfur dioxide or bisulfite derivatives of previously formed polymers of acrolein. Especially preferred reducing agents to be employed include the sulfur dioxide adducts of polyacroleins having an intrinsic viscosity of at least 0.3 dl./g. and prepared by polymerizing acrolein in a redox catalyst system as described from the preparation of the copolymers of the present invention.

Salts of multivalent metals may also be used as reducing agents in the present process, but their presence is less preferred than the above-described types. By multivalent metal is meant one that can change its valency state reversibly. Examples of such metals include, among others, iron, manganese, copper, vanadium, cobalt, nickel, tin, silver, titanium, etc. When added to the reaction mixture, the metal must be at least in part in a lower valency state such as, for example, ferrous chloride, silver nitrate, titanium dichloride, cobaltous chloride, ferrous pyrophosphate, potassium ferrocyanide, manganous sulfate, ferrous sulfate, and the like. The anion portion of the metal salt may be of any type as long as the resulting salt has the necessary solubility in the reaction medium.

The amount of the reducing agent employed will vary depending on the amount of the peroxide catalyst employed. It is preferred to have from about .3 mol to 1.5 mol of reducing agent per mol of peroxide catalyst. Preferably, the reducing agent is employed in an amount varying from about .5 to 1 mol per mol of peroxide.

Particularly good results are obtained when an anticoalescent agent is included in the reaction mixture. The presence of such materials brings about an increase in rate of copolymerization and maintenance of high molecular weight. The agent may be a cationic, anionic or nonionic material and have a great variety of different compositions. Preferred materials include the ionic agents and especially those having a polar structure including a hydrophobic (predominantly hydrocarbon) residue and a charged (ionic) radical thereon, such as anionic surface active compounds including alkali metal and nitrogen-base soaps of higher fatty acids, such as potassium, and sodium myristate, laurate, palmitate, oleate, stearate, ammonium stearate, etc., as well as the surface active compounds of the cation-active variety, such as salts of long-chain aliphatic amines and quaternary ammonium bases, such as lauryl amine hydrochloride, stearyl amine hydrochloride, palmityl amine hydrobromide. Additional examples of suitable ionic surface-active agents include the alkali metal or ammonium alkyl or alkylene sulfonates or sulfates, such as sodium and/or potassium lauryl sulfate, allyl, aryl and alkylated arylsulfonates, cetyl sulfonates, oleylsulfonate, stearylsulfonate, sulfonated Turkey red oil, sulfonated mineral oils, sodium, potassium and ammonium isopropyl naphthalene sulfonate, amine substituted alcohols, sulfonated fatty esters and amides, the hydrochloride of diethyl aminoethyloleylamide, trimethylcetyl ammonium methyl sulfate, alkanesulfonic acids, alkali metal and ammonium salts of sulfonated long-chain hydrocarbons, or sulfonated long-chain fatty acids, such as sulfonated oleic acid and the sodium, potassium and ammonium salts of sulfated cetyl alcohol.

Also preferred are the non-ionic surface active agents, i.e., those which are not salts and are not subject to ionization when added to water. Examples of these agents include, among others, partial esters of polyhydric alcohols and saturated or unsaturated fatty acids and preferably fatty acids containing at least and more preferably from 12 to 18 atoms, and hexitans and hexitides such as sorbitan or mannitan monolaurate, monopalmitate, monostearate, monooleate or the monoesters of coconut oil fatty acids and the like products described in U.S. 2,322,820. Other examples of partial esters of this type include the pentaerythritol mono- and dipalmitate, pentaerythritol mono- and distearate, pentaerythritol mono- and dioleate, 1,2,6-hexanetriol mono- and dicaproate, 1,2,6-hexanetriol mono- and dioleate, trimethylolpropane distearate, trimethylolpropane dilaurylate, polyglycerol dilaurate, inositol monolaurate, glucose monostearate, sucrose monooleate, polyglycol monooleate, polyglycol monostearate, and the like.

Examples of other suitable non-ionic agents include the hydroxypolyoxyalkylene ethers of the above-described partial esters. Specific examples of this include, among others, the polyethylene glycol ethers of sorbitan or mannitan monolaurate, monopalmitate, monooleate or monostearate. Other examples include the polyethylene glycol ethers or pentaerythritol mono- and dipalmitate, pentaerythritol mono- and distearate, trimethylolpropane distearate, polyglycerol dilaurate, inositol monolaurate and the like.

Other examples include the hydroxypolyoxyalkylene ethers of phenols, such as the reaction product of ethylene oxide and/or propylene oxide and phenols as phenol, Bisphenol-A, resorcinol, and the like, and mixtures thereof.

Other examples include di- and monoethers of polyhydric compounds and particularly the polyalkylene glycols. Especially preferred are the aryl and alkaryl polyethylene glycol ethers, such as phenyl polyethylene glycol monoether, xylylpolyethylene glycol monoether, alkyl phenyl polyalkylene glycol ethers, such as nonyl pheny polyethylene glycol ether, isopropylphenyl polyethylene glycol monoether and the like.

In operating the process, all of the ingredients may be added at one time or one or more of the ingredients added to the reactor at a later time or intermittently or continuously throughout the reaction. It is desirable in many cases, and particularly in those cases where one of the monomers polymerize much faster than the other, to add one or more of the monomers intermittently or continuously throughout the reaction. In the case of the vinyl-substituted sulfonates, for example, it has been found that they polymerize faster than the unsaturated aldehydes, such as acrolein, and it is highly desirable to add such monomers throughout the course of the reaction. These monomers may be added so as to keep the ratio of concentration of the monomers substantially constant or as to vary the ratio of concentrations as desired. Copolymers which have substantially homogeneous compositions are particularly desired.

The process will yield various types of copolymers from water-soluble products to water-insoluble products up to partially cross-linked products, depending on the control employed in the process. For example, if the water-soluble polymers are desired, means are preferably employed to short stop the reaction before partial gelation starts to take place. This may be accomplished by various means, such as, for example, by addition of short stopping agents, rapid dilution of the reaction mixture, destruction of the catalyst system or by stripping of one or more of the monomers. The copolymers may also be polymerized by use of high energy ionizing radiation and the polymerization stopped by removal of the radiation.

Preferred means include addition of short stopping agent. Suitable short stopping agents include, among others, hydroquinone, mercaptans, polyamines, alcohols, ketones, and the like. These materials are employed in various amounts depending upon the nature of the material and the nature of the reactants. It is generally preferred to employ from about 0.01% to about 5% by weight of the short stoppers based on the weight of the monomers being polymerized, and still more preferably from 0.1% to 3% by weight of the monomers being polymerized.

The temperature employed in the process may vary over a considerable range. It is generally preferred to employ relatively low temperatures. In general, temperatures will vary from the freezing point of the reaction mixture to about 50° C. Preferred temperatures range from about 0° C. to 45° C. Atmospheric, superatmospheric or subatmospheric pressures may be utilized as desired.

The polymerization is preferably effected in an inert atmosphere. This may be preferably accomplished by passing inert gases, such as nitrogen, methane, etc., into and through the reaction mixture. It is also preferred to distill the monomers under nitrogen before use in the process.

The process may be conducted batchwise or on a semi-continuous or continuous scale.

The copolymers may be recovered in a great variety of different forms depending on control of the reaction as noted above. Some may be recovered as water-insoluble viscous liquids to solid polymers. These products will settle out of the reaction mixture and may be recovered by filtration, centrifugation, extraction and the like. The water-soluble products will remain in the aqueous reaction mixture. The degree of polymerization can be followed by observing the change in viscosity of the reaction mixture. At the conclusion of the reaction, the water-soluble polymers can be retained in the water system and used as such or the polymers may be recovered by any suitable means, such as stripping out monomer and water, evaporation, precipitation, extraction and the like. The water-soluble polymers may vary from viscous water-thinable liquids to water-soluble solids.

The new copolymers have substantially high molecular weights. They will have intrinsic viscosities of at least 0.3 and preferably 0.5 to 5.0 dl./g. These values are determined by the conventional technique of polyelectrolyte viscosity measurements at 25° C. On a mol weight basis, such polymers have molecular weights ranging preferably from about 50,000 to 10,000,000 as determined by the light scattering technique. The water-soluble products have intrinsic viscosities preferably ranging from 0.5 dl./g. to 3.5 dl./g.

The new copolymers are also characterized by the fact that they contain free aldehyde groups or potentially free aldehyde groups. Some of the aldehyde groups will appear in hydrated form so that the polymer may contain units such as

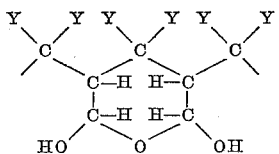

and

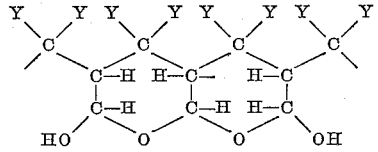

wherein Y is hydrogen or an organic radical and preferably a hydrocarbon radical as an alkyl, cycloalkyl, alkenyl or aryl radical containing up to 8 carbon atoms.

The new copolymers also possess a plurality of side chains containing sulfonic acid or sulfonate groups, e.g., side groups terminating with —$SO_3H$ and/or —$SO_3X$ wherein X is a metal and preferably an alkali or alkaline earth metal.

The copolymers of the present invention possess many new and unobvious properties and as a result find application in a great many fields. In solid form, for example, they may be molded and formed into attractive plastic articles or blended or added as additives to other polymeric materials as polystyrenes, polyethylenes, polyacrylates, polycarbonates, epoxy resins and the like.

In solution, and particularly in aqueous solution, they may be used in the formation of surface coating compositions or as impregnating compositions.

The new copolymers have been found to be particularly useful in solution. The water-insoluble copolymers can be put into solubilized form by a variety of methods. The water-soluble derivatives of such polymers are preferably obtained by suspending the copolymer in an aqueous medium containing a water-solubilizing agent, such as, for example, sulfur dioxide or an alkali bisulfite. The amount of the polymer added will vary depending upon the particular agent involved and the concentration of the agent. In general, it is preferred to add from 1 to 50 parts of the polymer per 100 parts of water. The concentration of the solubilizing agent may vary over a wide range depending on the type of product desired. In general, the amount will vary from about 1% to 25%. Stirring and heating may be applied to assist in the dissolution. The temperatures employed will generally vary from about 20° C. to about 90° C. Various other means, such as addition of small amounts of acid catalyst or the addition of swelling agents as acetone, or tetrahydrofuran may also be employed to assist in the dissolution.

The above-described water-soluble derivatives will have substantially the same molecular weight as the water-insoluble basic polymer. In the case of the sulfur dioxide and bisulfite dissolved polymer, the derivative will contain a plurality of free sulfonic acid groups (or sulfonate groups in case of neutralization or reaction with salt forming materials) in the polymer molecule. Such products will, for example, contain groups such as

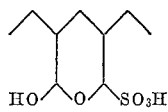

(the backbone of the polymer is as described above).

These solubilized copolymers as well as the water-soluble copolymers prepared directly from the process of the invention as noted above are particularly useful and valuable alone or with catalysts for the treatment of fibrous materials as they tend to improve the properties, such as strength, crease resistance, fold endurance, and the like thereof. Materials that may be treated include, among others, textile fabrics and fibers, leather, paper, and the like. When used for the treatment of paper, these new water-soluble products impart improved fold endurance and improved wet strength thereto.

The new water-soluble copolymers and derivatives may be employed for treatment of fibrous materials in a variety of ways. They are preferably employed as aqueous solutions when applied to the paper. These aqueous solutions may be those obtained directly from the copolymerization, or they may be ones prepared from the solid copolymer or water-soluble derivative. The concentrations of the solutions preferred for this application preferably vary from about 0.1% to 5% aqueous solution. Especially preferred concentrations vary from about .5% to 2.5% by weight.

The water solutions used in the treatment of the fibrous material may be basic, neutral or acidic, but it is generally preferred to employ basic solutions. Particularly superior results are obtained, both in the dipping process and in the wet end treatment, by adding a polyvalent metal salt, such as, for example, aluminum sulfate, zinc sulfate and the like to the bath containing the new copolymers or derivatives. When this technique is employed, much higher wet strength retention values are obtained as compared to those obtained by using the usual procedure without the added salts.

Emulsifying agents, water-dispersible binding colloids, plasticizers, anti-oxidants, dyes, fillers, curing agents, etc. may also be included in the aqueous system, but are not essential to obtaining the results set out above.

As indicated above, the aqueous systems containing the new polymers and derivatives may be applied to the fibrous materials in any suitable way. If it is desired to apply the solution only to one surface of the material, as, for example, when it is desired to treat the back only of a fabric or paper having a face of a different material, the application may be effected by spraying as a liquid or gas or by means of rollers, or the composition may be spread upon the surface by means of a doctor blade. When, however, it is desirable to coat both surfaces of the material, or if the material is to be thoroughly impregnated with it, the material may be simply dipped in the solution or run through conventional-type padding rollers. The solutions may also be applied locally to the material, for example, by means of printing rollers or by stencilling.

In the case of paper, the copolymers or derivatives or solutions thereof may be added at any stage during the wet end preparation. By wet end is meant any stage from the time the pulp is added to the water to the time when the pulp makes up more than the water. It is preferred to employ the new copolymers or derivatives directly on the finished paper or at the beater stage.

If one adds the new copolymers or derivatives during the beater stage, the beater operations may be any of those now used for this purpose. One merely needs to pour or otherwise add the solubilized polymer solution directly to the aqueous suspension of pulp either all at once or intermittently over a short period of time. The solid polymer derivatives may also be added directly at this stage.

If the aqueous system is to be applied to the finished paper, it may be added by spraying, by rollers, by dipping or by running the paper through a conventional-type padding apparatus. Amount of pick-up will vary, but in most cases vary from about 50% to 100% based on the weight of the paper.

After the aqueous solution has been applied to the fibrous material as indicated above, the treated product is then subsequently dried to effect the cure. The drying may be accomplished by merely rolling or squeezing off the excess solution and then setting the treated product out in the air to dry, or by use of forced air. Temperatures used in the drying may vary from about room temperature, e.g., about 20° C. to 100° C. The period of drying will depend largely on the amount of pick-up and concentration of the polymer solution. In most instances, drying periods of from about 1 to 30 minutes should be sufficient.

The above-described process may be utilized for the treatment of any fibrous material. This includes textile material, such as woven fabrics, non-woven fabrics, threads, yarn, cord, and string, paper, leather, films and the like. These materials may be prepared from natural or synthetic materials, such as cotton, linen, natural silk and artificial silk, such as silk obtained from cellulose acetate or other organic esters or ethers of cellulose, rayons, jute, hemp, animal fibers, such as wood, hair, and the like, as well as synthetic materials which include those prepared from polyamides, polyesters, polymers of vinyls, such as acrylonitrile, vinyl chloride, and the like.

The process is particularly suited for use in treating paper to improve properties, such as wet strength, burst strength, fold endurance and the like. Examples of such paper include, for example, those prepared from wood, cotton, linen, hemp, jute, mulberry, straw, bamboo fibers or mixtures thereof, by any of the known processes, such as the sulfate process, soda process, sulfite process. The paper may be colored or white and may be further treated for special applications.

The paper treated according to the process of the invention may be used for a variety of applications such as facial tissue, hand towels, maps, filing cards, construction paper, wrapping paper, containers and the like. Because of its resistance to hydrolysis and relative non-toxic nature, the paper is particularly suited for use in preparing wrapper or containers for food.

The new copolymers of the invention are also useful for the treatment of fibers and fabrics as in the capacity of warp sizing agents and crease proofing materials, and as adhesives for cellulosic materials as wood, paper sheets and the like.

The new copolymers can also be used to form valuable ester, amide, imide and polyurethane derivatives.

To illustrate the manner in which the invention may be carried out, the following examples are given. It is to be understood, however, that the examples are for the purpose of illustration and the invention is not to be regarded as limited to any of the specific materials or conditions recited therein. Unless otherwise indicated, parts are parts by weight.

*Example I*

This example illustrates the preparation and some of the properties of a water-soluble copolymer of acrolein and sodium vinylbenzenesulfonate.

To a glass reaction vessel were added the following components in the order given:

750 parts of water, 1 part of nonylphenol-ethylene oxide adduct, 60.3 parts of sodium p-vinylbenzenesulfonate, 10 parts of a 4% aqueous solution of a polyacrolein-sulfur dioxide adduct having an intrinsic viscosity of 1.35, 140 parts of freshly distilled acrolein and 40 parts of an 0.05 molar solution of tertiary butyl hydroperoxide. This mixture was stirred and kept at room temperature (e.g., 20° C.) for 2¼ hours. 10 parts of a 2.7% hydroquinone solution in acetone was added and the excess acrolein and water were stripped off leaving a clear viscous liquid copolymer. The copolymer had an intrinsic viscosity of 1.8 dl./g. and contained about 60 parts acrolein units and 40 parts sodium vinylbenzenesulfonate units. The copolymer was soluble in water and could be thinned with water to form clear aqueous polymer solutions.

The polymer solution prepared above was diluted with water to form 0.5%, 1% and 2% solutions and 1% alum added thereto. Sheets of rag and kraft paper were then passed into and through the solutions. The treated sheets were pressed out on dry paper and allowed to dry at room temperature. The resulting product had the appearance, feel and flexibility of the untreated paper, but demonstrated improvement in fold endurance, dimensional stability and improved wet strength.

*Example II*

Example I was varied by adding the hydroquinone after 5¼ hours of reaction. The product in this case was a viscous water thinable copolymer having an intrinsic viscosity of 1.3 dl./g.

The copolymers prepared above was mixed with water to form 0.5%, 1% and 2% solutions and 1% alum added thereto. Sheets of rag and kraft paper were then passed into and through the solutions. The treated sheets were pressed out on dry paper and allowed to dry at room temperature. The resulting product had the appearance, feel and flexibility of the untreated paper, but demonstrated improvement in fold endurance, dimensional stability and improved wet strength. The retention of intrinsic burst strength when wet is shown in the following table:

| Paper | Control | Solutions Employed | | |
|---|---|---|---|---|
| | | 0.5% | 1% | 2% |
| | Percent | Percent | Percent | Percent |
| Rag | 4 | 44 | 60 | 96 |
| Kraft | 5 | 38 | 47 | 65 |

*Example III*

This example illustrates the preparation and some of the properties of a water-soluble copolymer of acrolein and sodium vinylbenzenesulfonate wherein the monomers were in a 90:10 ratio.

To a glass reaction vessel were added the following components in the order given:

752 parts of water, 20 parts of sodium p-vinylbenzenesulfonate, 10.3 parts of a 4% aqueous solution of a polyacroleinsulfur dioxide adduct having an intrinsic viscosity of 1.35, 147.4 parts of freshly distilled acrolein and 40.1 parts of an 0.05 molar solution of tertiary butyl hydroperoxide. This mixture was stirred for 4 hours at 21° C. 0.6 part of hydroquinone was then added to the reaction mixture to stop the polymerization. The acrolein was then stripped off under reduced pressure leaving a clear copolymer solution. Evaporation of the water left a glassy copolymer having an intrinsic viscosity of 1.0 and containing about 90 parts of acrolein and 10 parts of sodium vinylbenzenesulfonate.

The polymer solution prepared above was diluted with water to form 0.5%, 1% and 2% solutions for treatment of paper. Sheets of rag and kraft paper were then passed into and through the solutions. The treated sheets were pressed out on dry paper and allowed to dry at room temperature. The resulting product had the appearance, feel and flexibility of the untreated paper, but demonstrated improvement in fold endurance, dimensional stability and improved wet strength.

*Example IV*

Example I is repeated with the exception that the acrolein is replaced with methacrolein. Related results are obtained.

*Example V*

Example I is repeated with the exception that the sodium p-vinylbenzenesulfonate was replaced with potassium p-allylbenzenesulfonate. Related results are obtained.

*Example VI*

Example I is repeated with the exception that the sodium p-vinylbenzenesulfonate is replaced with sodium vinylnaphthalenesulfonate. Related results are obtained.

*Example VII*

This example illustrates the preparation and use of a copolymer of acrolein and sodium allylsulfonate.

To a glass reaction vessel were added the following components in the order given:

650 parts of water, 1 part of nonylphenol-ethylene oxide adduct, 10 parts of a 4% solution of a polyacrolein-sulfur dioxide adduct as defined in Example I, 160 parts of freshly distilled acrolein, 60 parts of sodium allyl sulfonate and 40 parts of 0.05 molar solution of tertiary butyl hydroperoxide. This solution was kept at room temperature for 5 hours. The mixture was then filtered to recover a solid copolymer having an intrinsic viscosity of 0.98 dl./g. The product was insoluble in water, but formed a water soluble derivative when added to aqueous sulfur dioxide.

*Example VIII*

This example illustrates the preparation and some of the properties of a copolymer of acrolein and a sodium salt of a methacrylic acid ester of hydroxypropanesulfonic acid.

The following components were mixed in the order indicated: 462 parts of water, 130 parts of acrolein, 6.42 parts of the above-noted sodium salt, 2.63 parts of a 6.12% aqueous solution of a polyacrolein-sulfur dioxide adduct, and 41.2 parts of a .25% solution of tertiary butyl hydroperoxide. This mixture was stirred in the presence of nitrogen and kept at room temperature for several hours. The solution slowly formed a milky color and appeared as a creamy latex-like suspension. At the end of 24 hours, 0.13 part of hydroquinone was added to stop the reaction. Evaporation of the water left slightly yellow glassy solid copolymer. Analysis indicated the product was a high molecular weight copolymer of acrolein and the methacrylic acid ester of hydroxypropanesulfonic acid. The polymer dissolved in aqueous sulfur dioxide to form a water-soluble derivative useful for the treatment of paper.

*Example IX*

Example VIII is repeated with the exception that the sodium salt employed is a sodium salt of an acrylic acid ester of hydroxybutanesulfonic acid. Related results are obtained.

*Example X*

Example VIII is repeated with the exception that the proportions of reactants are changed so as to form a copolymer containing 70 parts of acrolein and 30 parts of sodium salt. The resulting copolymer had good solubility in aqueous sulfur dioxide and the resulting derivative is useful in the treatment of paper.

*Example XI*

93 parts of a 25% aqueous solution of sodium vinyl sulfonate was combined with water to make a total of 750 parts. To this was added 10 parts of a 4% aqueous solution of polyacrolein-sulfur dioxide adduct having an intrinsic viscosity of 1.35 dl./g., 141 parts of freshly distilled acrolein and 40 parts of an 0.05 molar solution of tertiary butyl hydroperoxide. This mixture was stirred for several hours at 20° C. The resulting copolymer formed as a white insoluble solid. The polymer was recovered by filtration. Analysis indicated the product was a high molecular weight copolymer of acrolein and sodium vinyl sulfonate. The product was insoluble in water but soluble in aqueous sulfur dioxide. The sulfur dioxide adduct was useful for the treatment of paper.

*Example XII*

This example illustrates operation of the process of the invention wherein one of the monomers is added during the course of the reaction.

500 parts of water, 20 parts of p-vinylbenzenesulfonate, 10 parts of a 4% solution of a polyacrolein sulfur dioxide adduct having an intrinsic viscosity of 1.35 dl./g., 134 parts of freshly distilled acrolein were combined in the order indicated. 40 parts of 0.05 molar solution of tertiary butyl hydroperoxide was added dropwise to the reaction mixture. The mixture was stirred at 20° C. for 4 hours and then 20 parts of p-vinylbenzenesulfonate in 250 parts of water was added dropwise over 8 hour period. At the end of that time the solution had thickened but was still clear indicating the copolymer was water-soluble and remaining in solution. Evaporation of the water left a glassy copolymer having an intrinsic viscosity of about 1.0 dl./g.

1% and 2% aqueous solutions of the above copolymer obtained by dilution of the above-described reaction mixture are used for the treatment of paper as shown in the preceding examples. The resulting sheets have improved wet strength.

*Example XIII*

This example illustrates the preparation of a copolymer wherein a third monomer, i.e., maleic anhydride, is included with the acrolein and sodium p-vinylbenzenesulfonate, and the product is prepared by use of high energy ionizing radiation.

125 parts of acrolein, 7 parts of maleic anhydride and 7 parts of sodium p-vinylbenzenesulfonate were added to 500 parts of water. This mixture was exposed to an X-ray beam at room temperature at a dose rate of a megarad per hour. The reaction was stopped after about 4800 seconds of radiation. The resulting product was a high molecular weight water-soluble three component copolymer containing units of acrolein, maleic anhydride and p-vinylbenzenesulfonate.

0.5%, 1% and 2% aqueous solutions of the above-noted copolymer are effective for improving the wet strength of paper.

*Example XIV*

Example XIII is repeated with the exception that the maleic anhydride is replaced with each of the following: styrene, methyl acrylate, butadiene, vinyl acetate and acrylonitrile. Related results are obtained.

We claim as our invention:

1. A copolymer of an alpha,beta-unsaturated aldehyde and an unsaturated monomer containing a member of the group consisting of the sulfonic acid radical and sulfonate radicals.

2. A copolymer of an alpha,beta-ethylenically unsaturated aldehyde and an ethylenically unsaturated monomer possessing a sulfonate group.

3. A water soluble copolymer of an alpha,beta-ethylenically unsaturated aldehyde and a water soluble salt of an ethylenically unsaturated sulfonic acid.

4. A copolymer as in claim 3 wherein the product has an intrinsic viscosity between 0.1 dl./g. and 2.5 dl./g.

5. A copolymer as in claim 3 wherein the unsaturated aldehyde contains from 2 to 12 carbon atoms.

6. A copolymer as in claim 3 wherein the unsaturated aldehyde is acrolein.

7. A copolymer as in claim 3 wherein the unsaturated aldehyde makes up from 5% to 99% by weight of the copolymer.

8. A copolymer as in claim 3 wherein the acrolein makes up from 95% to 50% by weight of the copolymer.

9. A copolymer of an alpha-beta-ethylenically unsaturated aldehyde, an unsaturated monomer containing a member of the group consisting of sulfonic acid radical and sulfonate radical, and a third dissimilar ethylenically unsaturated monomer.

10. A copolymer as in claim 9 wherein the aldehyde is acrolein, the monomer containing a sulfonate group is p-vinylbenzenesulfonate and the third monomer is maleic anhydride.

11. A copolymer as in claim 9 wherein the aldehyde is acrolein, the monomer containing a sulfonate group is p-vinylbenzenesulfonate and the third monomer is styrene.

12. A copolymer of acrolein and a sodium salt of a methacrylic acid ester of hydroxypropanesulfonic acid.

13. A copolymer of acrolein and sodium vinylsulfonate.

14. A water solution of the copolymer defined in claim 3.

15. A water solution of a water-soluble copolymer of acrolein and sodium vinylbenzenesulfonate.

16. A process for preparing a copolymer of an alpha, beta-ethylenically unsaturated aldehyde and an ethylenically unsaturated monomer containing a member of the group consisting of the sulfonic acid radical and sulfonate radicals, which comprises contacting a mixture of the monomers with a redox catalyst system.

17. A process for preparing a copolymer of acrolein and an ethylenic unsaturated monomer containing a sulfonate group which comprises contacting a mixture of the monomers in an aqueous medium with a peroxide catalyst and a reducing agent at a temperature between 10° C. and 60° C.

18. A process for preparing a water-soluble copolymer of acrolein and an ethylenically unsaturated monomer containing a sulfonate group which comprises contacting a mixture of the monomers in an aqueous medium with a peroxide catalyst and reducing agent and stopping the polymerization before gelation sets in.

19. A process as in claim 18 wherein the monomer containining a sulfonate group is sodium vinylbenzenesulfonate.

20. A process for treating fibrous materials to improve the properties thereof which comprises applying to the fibrous material an aqueous solution of a water soluble copolymer defined in claim 3.

21. A process for treating fibrous material to improve properties thereof which comprises applying to the said material an aqueous of a water soluble copolymer of acrolein and an alkali metal salt of a vinylarylsulfonate.

22. A process for treating cellulosic paper to improve the wet strength thereof which comprises padding the paper with a water solution of a water soluble copolymer of acrolein and sodium vinylbenzenesulfonate.

23. A process as in claim 20 wherein the fibrous material is a cellulosic fabric material.

No references cited.